United States Patent [19]

Richards

[11] 4,175,726
[45] Nov. 27, 1979

[54] BALL VALVE AND SEAL

[75] Inventor: Cecil G. Richards, Aspley, Australia

[73] Assignee: B.C. Richards & Co. Pty. Ltd., Geebung, Australia

[21] Appl. No.: 822,943

[22] Filed: Aug. 8, 1977

[30] Foreign Application Priority Data

Aug. 6, 1976 [AU] Australia .............................. PC6904

[51] Int. Cl.² .............................................. F16K 5/06
[52] U.S. Cl. .................................................... 251/315
[58] Field of Search ......................................... 251/315

[56] References Cited

U.S. PATENT DOCUMENTS

| | | | |
|---|---|---|---|
| 2,855,177 | 10/1958 | Freeman | 251/315 X |
| 3,288,430 | 11/1966 | Priese | 251/315 |
| 3,948,480 | 4/1976 | Paptzun et al. | 251/315 |
| 3,970,285 | 7/1976 | Lonn | 251/315 X |

Primary Examiner—William R. Cline
Attorney, Agent, or Firm—Donald D. Jeffery

[57] ABSTRACT

A ball valve has a body with opposed coaxial inlet and outlet passages leading to and from a ball chamber containing an apertured ball which may be turned by a handle to open or close the way between the inlet and outlet passages, a pair of sealing rings at the inner ends of the inlet and outlet passages bearing against the ball, the inlet sealing ring being backed by a fixed annular flange, the outlet sealing ring being backed by an annular insert screwed into the inner end of the outlet passage to press the sealing rings firmly against the ball. The inlet and outlet passages have tapered threads, but the inner part of the outlet passage in which the insert is screwed has a cylindrical thread.

1 Claim, 1 Drawing Figure

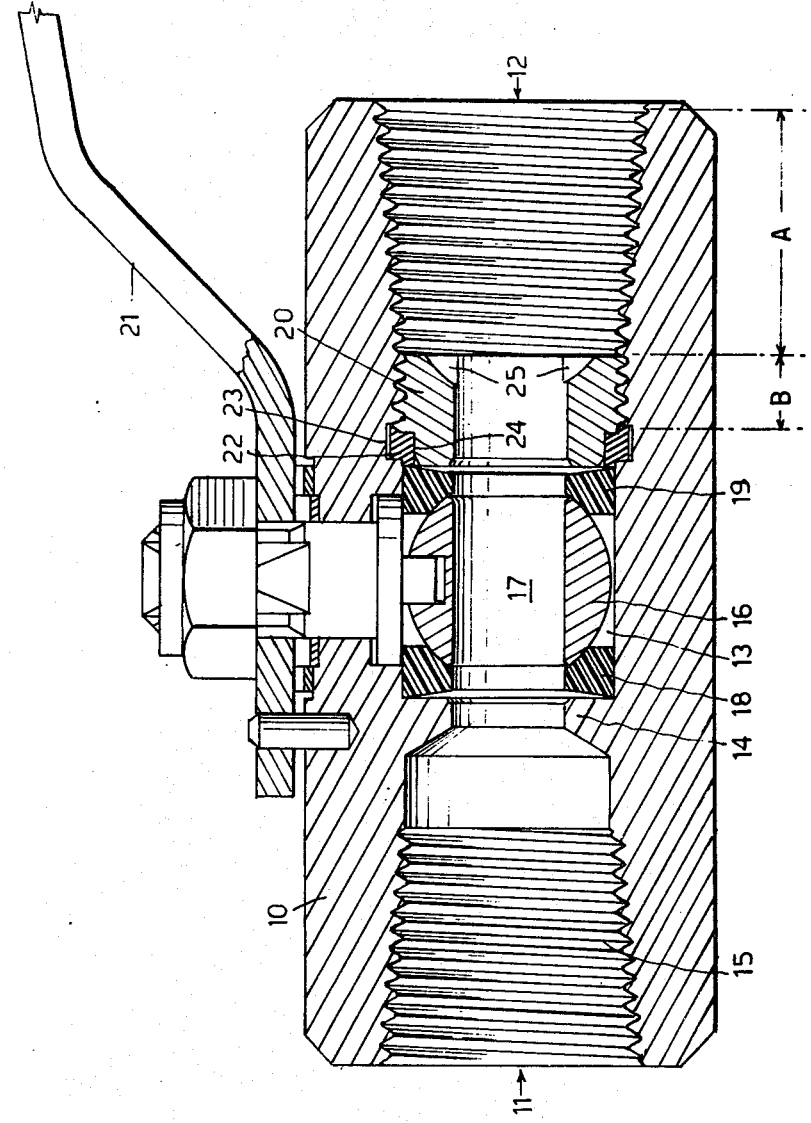

BALL VALVE AND SEAL

BACKGROUND OF THE INVENTION

This invention relates to an improved ball valve, of the type in which an apertured ball is rotatable to open or close the way between an inlet and an outlet.

Ball valves of this type are commonly used in oil refinery installations, and are required to withstand high fluid pressure without permitting any leakage. Such a ball valve is described in the specification of my co-pending U.S. patent application No. 691,483, now U.S. Pat. No. 4,068,822, granted Jan. 19, 1978, and has a body with coaxial inlet and outlet passages leading to and from a chamber housing a diametrically apertured ball which is rotatable, by a handle, about an axis perpendicular to that of the inlet and outlet. Resilient seal rings contact the ball on its inlet and outlet sides, the ring to the inlet side of the ball being backed by a fixed annular flange within the body, the other ring, to the outlet side of the ball, being backed by an annular insert threadedly engaged in the outlet passage. A deformable ring, lying partly in an annular groove in the outlet passage and partly in an annular rebate in the annular insert, greatly improves the sealing qualities of the assembly, being deformed, when the annular insert is screwed hard into place, to press against the peripheral part of the near sealing ring and also against the body.

The inlet and outlet passages of the ball valve are formed with tapered threads to receive correspondingly threaded inlet and outlet pipes, for optimum sealing, and a disadvantage of the ball valve described has been the difficulty encountered in the accurate longitudinal locating of the threaded insert, engaged in the tapered thread of the outlet passage.

SUMMARY OF THE INVENTION

The present invention provides a ball valve of the type described in which the threaded annular insert bearing against a sealing ring engaging the ball of the valve may be installed with precision longitudinally, so that optimum sealing of the assembly against leakage may be ensured.

The invention resides broadly in a ball valve of the type having a body, a ball chamber in the body, inlet and outlet passages in the body, the inlet passage leading to, and the outlet passage leading from, the ball chamber, a diametrally apertured ball in the ball chamber, means for rotating the ball to open or close the way from the inlet passage to the outlet passage, a pair of sealing rings engaging the ball about the inlet and outlet passages, and an annular insert threadedly engaged in the outlet passage and adapted to be screwed into the outlet passage towards the ball to force the sealing rings into firm engagement with the ball; characterized in that the annular insert is substantially cylindrical and engaged in a cylindrical threaded inner part of the outlet passage, the outer part of the outlet passage being formed with an internal tapered thread tapering towards the said cylindrical threaded inner part of the outlet.

BRIEF DESCRIPTION OF THE DRAWING

The accompanying drawing is a sectional view of a ball valve according to a preferred embodiment of the invention.

DESCRIPTION OF THE PREFERRED EMBODIMENT

The ball valve illustrated includes a body 10 with coaxial inlet and outlet passages 11 and 12 formed from opposite ends to lead to a central ball chamber 13. The innermost part of the inlet passage 11 is reduced in diameter to form an annular flange 14.

The inlet passage 11 is formed with a tapered thread as indicated at 15, for engagement by a correspondingly threaded inlet pipe (not shown). The outlet passage 12 is also formed with a tapered thread within its main outer part A, but a relatively short inner part B of this passage is formed with plain or cylindrical thread.

A ball 16 with a diametral passage 17 is located within the ball chamber 13, and is engaged on the inlet side by an annular resiliently deformable sealing ring 18 which is backed by the fixed flange 14. On the outlet side, the ball is engaged by a further similar sealing ring 19, which is backed by an externally threaded annular insert 20 engaged in the threaded cylindrical part B of the outlet passage 12.

By means of a handle 21 the ball 16 may be turned, about an axis perpendicular to that of the inlet passage 11 and outlet passage 12, to fully open position, as shown, or through a right angle to fully closed position.

A deformable ring 22, which may suitably be of asbestos, is engaged partly in an annular groove 23 about the outlet passage 12 near to the ball chamber 13, and partly in a peripheral rebate 24 in the inner end of the annular insert 20. When the threaded annular insert 20 is screwed hard towards the ball 16, by means of a suitable tool engaging diametrically opposed notches 25 in the outer end of the insert, the deformable ring 22 is forced hard against the outer peripheral edge of the sealing ring 19, and also against the body 10 and insert 20, making a good fluid tight seal. The threaded annular insert 20 may be screwed towards the ball to desired extent without being limited or restricted as would be the case were it engaged in a tapered thread, which is a necessary or very desirable provision in the outer part A of the outlet passage, made for engagement by a correspondingly threaded outlet pipe.

I claim:

1. A ball valve of the type having a body; a ball chamber in the body; inlet and outlet passages in the body; the inlet passage leading to, and the outlet passage leading from, the ball chamber; a diametrically apertured ball in the ball chamber; means for rotating the ball to open or close the way from the inlet passage to the outlet passage; a pair of sealing rings engaging the ball about the inlet and outlet passages; an annular insert threadedly engaged in the outlet passage and adapted to be screwed into the outlet passage towards the ball to force the sealing ring in said outlet passage into firm engagement with the ball, said annular insert being substantially cylindrical and engaged in a cylindrical threaded inner part of the outlet passage, the outer part of the outlet passage being formed with an internal tapered thread tapering towards the said cylindrical threaded inner part of the outlet passage; a peripheral annular rebate at the axially inner end of the annular insert, the rear face of said rebate forming a radially extending contact surface; an annular groove formed in said body about the inner part of said outlet passage; and a deformable ring positioned partly in said peripheral rebate and partly in said annular groove, the front face of said deformable ring, when said annular insert is in an assembled position, contacting the front face of said groove and the outer peripheral edge of the rear face of said sealing ring in said outlet passage, and the rear face of said deformable ring contacting the radial rear face of said rebate thereby to provide solid line contact at both the front and rear faces of said deformable ring to provide a fluid tight seal.

* * * * *